(No Model.)

W. O. MILLS.
THROAT PROTECTOR FOR HORSES.

No. 378,373. Patented Feb. 21, 1888.

WITNESSES.
Gustav Bohn.
E. B. Griffith.

INVENTOR.
William O. Mills.
By C. F. Jacobs.
atty.

UNITED STATES PATENT OFFICE.

WILLIAM O. MILLS, OF ZIONSVILLE, INDIANA.

THROAT-PROTECTOR FOR HORSES.

SPECIFICATION forming part of Letters Patent No. 378,373, dated February 21, 1888.

Application filed December 7, 1887. Serial No. 257,174. (No model.)

*To all whom it may concern:*

Be it known that I, WILLIAM O. MILLS, of Zionsville, county of Boone, and State of Indiana, have invented certain new and useful Improvements in Throat-Protectors for Horses; and I do hereby declare that the following is a full, clear, and exact description thereof, reference being had to the accompanying drawings, in which like letters refer to like parts.

My invention relates to the construction of devices for protecting the throat and under jaw of the horse from the attacks of stinging insects; and it consists in the arrangement of parts, as hereinafter set forth and claimed, and will be understood from the following description.

Figure 1:
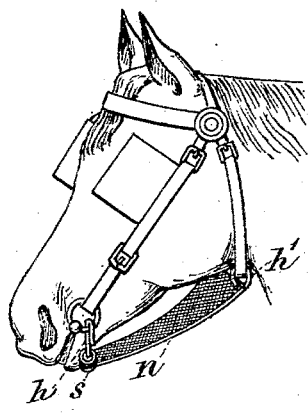
Figure 3:
Figure 2:
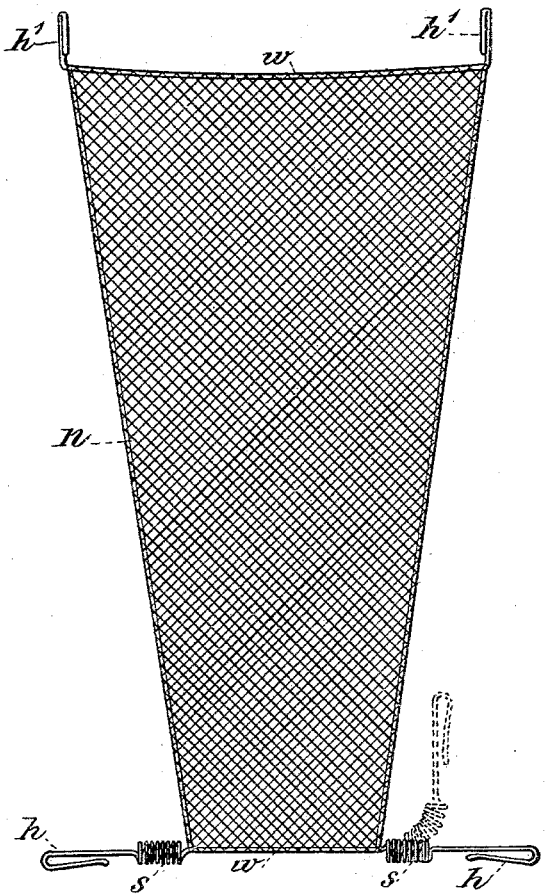

In the drawings, Figure 1 represents a side view of a horse's head with my device connected to the rings of the bit and throat-strap of the bridle. Fig. 2 is an enlarged top view of the device. Fig. 3 is an enlarged detail side view of one of the rear hooks.

In many parts of the country horses are liable to be stung by flies, and in the South and West especially by one particular fly commonly called the "nit-fly," which deposits its nits or eggs upon the legs of the horse. This fly is about the size of the ordinary honey-bee, and is provided with a sting in its tail, and while it does no injury whatever to the horse when it deposits its eggs or nits, it has a peculiar fancy or liking for stinging the horse directly beneath the head and between the bones of the under jaw, and it will dart upward suddenly and sting the horse in this spot, causing him great pain and rendering him furious and uncontrollable at times; and so far as my observation goes, and it is quite extended, the fly never stings the horse in any other place than at this point; but the reason of this I do not know. The skin may possibly be thinner and tenderer at this point, or the horse may not be so well able to protect himself there; but for whatever reason it may be, it is the spot selected by the nit-fly for stinging the horse, and in so doing it darts suddenly with its sting upward and head downward to make the wound. In order to protect the horse at this point, many farmers have been in the habit of tying bunches of old rags about the horse's neck and binding them about his head; but these are cumbersome and inconvenient, and I have therefore devised the protector herein shown, which operates perfectly and secures the desired result.

It consists of a netting, $n$, made of stout twine, preferably made wider in the rear than at the front. At the rear is a spring-wire, $w$, whose ends are formed into hooks $h'$, which are clasped over the throat-strap of the bridle on either side. The other end of the netting is connected to a spring-wire, $w$, which is straight where the end is fastened to it; but on either side are formed coiled springs $s$, the ends of the wire terminating in hooks $h$ on either side, as shown. These hooks are hooked into the rings of the bridle-bit, and the device when in position hangs a little beneath the horse's under jaw. The space between the net and the horse's head, as shown in Fig. 1, is a little enlarged, in order to show the relation of the parts more clearly; but so far as I have observed, the fly always darts up directly from below, and never comes in to make the attack from either side of the horse's head, and I do not think that it makes very much difference, therefore, whether the device be suspended a little below the horse's head or drawn up closer than as shown in the drawings.

When the device is locked into the horse's bit, the front hooks, $h$, will take the position shown in the dotted lines in Fig. 2, the coiled spring being bent backward and somewhat drawn out. These springs will allow for lateral expansion, so that when one side of the bit is pulled upon by the driver the spring will give and the protector will not be torn from its connection, nor the wire bent out of shape nor broken, and therefore the use of the spring is preferable to that of a straight wire with hooks in front, as shown at the rear; but plain wire may be used at both ends, if desired.

The body of the protector may be made of any suitable kind of material; but the netting is cool and strong, and therefore preferable to a closer fabric.

I do not claim the mere use of netting or gauze for covering the horse's head to protect him from the bite of insects, for I am aware that various kinds of netting have been frequently used to keep out insects, both as window-screens and for throwing over the horse's body; but What I do claim as my invention, and desire to secure by Letters Patent, is the following, viz:

1. A throat-protector for horses, comprising the body portion $n$, attached at its rear end to a spring-wire provided with hooks for locking over the throat-strap, and at its front end to a spring-wire having hooks for engaging with the rings of the bridle-bit, substantially as shown and described.

2. A throat-protector for horses, composed of a body portion made of netting or other suitable material, its rear end wider than its front, and connected at such rear end to a spring-wire with hooks for locking over the throat-strap, and its narrower or front end to a wire whose ends are formed into hooks for engaging with the rings of the bridle-bit, and coiled springs formed upon such wire between the hook and the central part, to which the protector is connected, for permitting lateral expansion, substantially as shown and described.

3. A throat-protector for horses, composed of a body portion made of netting or other suitable material, connected at its rear end to a spring-wire with hooks for locking over the throat-strap, and its narrower or front end to a wire whose ends are formed into hooks for engaging with the rings of the bridle-bit, and coiled springs formed upon such wire between the hook and central part, to which the protector is connected, for permitting lateral expansion, substantially as shown and described.

In witness whereof I have hereunto set my hand this 8th day of November, 1887.

WILLIAM O. MILLS.

Witnesses:
C. P. JACOBS,
E. B. GRIFFITH.